United States Patent [19]
Hukui et al.

[11] Patent Number: 5,782,716
[45] Date of Patent: Jul. 21, 1998

[54] DRIVING DEVICE FOR A BICYCLE

[75] Inventors: Seiji Hukui, Sakai; Nobuyuki Matsuo, Shimonoseki, both of Japan

[73] Assignee: Shimano, Inc., Osaka, Japan

[21] Appl. No.: 685,696

[22] Filed: Jul. 24, 1996

[30] Foreign Application Priority Data

Jul. 28, 1995 [JP] Japan .................................. 7-212412

[51] Int. Cl.$^6$ .............................. B62M 23/02; B60K 7/00
[52] U.S. Cl. .................................................... 475/149
[58] Field of Search .......................... 475/149; 180/65.5, 180/205, 220

[56] References Cited

U.S. PATENT DOCUMENTS

| | | | |
|---|---|---|---|
| 4,346,777 | 8/1982 | Restelli | 180/220 |
| 4,406,340 | 9/1983 | Gennaux | 180/65.5 |
| 4,930,590 | 6/1990 | Love et al. | 180/65.5 |
| 5,246,082 | 9/1993 | Alber | 180/65.5 |
| 5,272,938 | 12/1993 | Hsu et al. | 180/220 |
| 5,450,915 | 9/1995 | Li | 180/220 |
| 5,524,726 | 6/1996 | Wright, Jr. | 180/220 |
| 5,581,136 | 12/1996 | Li | 180/220 |
| 5,600,191 | 2/1997 | Yang | 180/65.5 |
| 5,633,544 | 5/1997 | Toida et al. | 180/65.5 |

FOREIGN PATENT DOCUMENTS

| | | | |
|---|---|---|---|
| 0 537 693 A1 | 4/1993 | European Pat. Off. | B62M 25/08 |
| 2377930 | 8/1978 | France | B62M 7/12 |
| 3009336 | 9/1980 | Germany | B62M 7/00 |
| 53-93515 | 8/1978 | Japan | B60K 1/00 |
| 54-38043 | 3/1979 | Japan | B62M 23/02 |
| 54-72408 | 6/1979 | Japan | H02K 7/116 |
| 6-156361 | 6/1994 | Japan | B62M 23/02 |
| 6-506891 | 8/1994 | Japan | B62M 23/02 |
| 1566994 | 5/1980 | United Kingdom | B60K 7/00 |

OTHER PUBLICATIONS

"Patent Abstracts of Japan," vol. 95, No. 9, Oct. 31, 1995; English abstract of JP 7-154941, published Jun. 16, 1995.
European search report for EP 96305416.8, dated Aug. 13, 1997.

*Primary Examiner*—Dirk Wright
*Attorney, Agent, or Firm*—James A. Deland

[57] ABSTRACT

A motor-driven hub for a bicycle includes a hub shaft, a hub body rotatably mounted about the hub shaft, a drive member coaxially mounted with the hub shaft, a motor coupled to the drive member for rotating the drive member, and a one-way clutch disposed in a transmission path between the drive member and the hub body for transmitting rotation of the drive member to the hub body only in one direction. A gear reduction mechanism in the form of a planetary gear unit may be mounted in the transmission path between the drive member and the hub body so that the hub body rotates slower than the drive member. The motor may be mounted outside the hub or inside the hub. When mounted inside the hub, the motor may be mounted coaxially about the hub shaft so that the center of gravity of the motor lies within the hub along the axis of the hub.

14 Claims, 4 Drawing Sheets

DRIVING DEVICE FOR A BICYCLE

BACKGROUND OF THE INVENTION

The present invention is directed to a motor-driven bicycle and, more particularly, to a motor-driven hub wherein the output member of the motor is mounted coaxially about the hub shaft of a front or rear wheel of the bicycle.

Motor-drive bicycles are known wherein batteries are carried and an electric motor is mounted to the bicycle on order to provide the motive force to the bicycle. The principal motive force for the bicycle is still human pedaling power, and the motor assists this human pedaling power. Various driving devices have been proposed for motor-driven bicycles. Such devices include driving devices in which a DC electric motor is built into one of the hubs of the bicycle as disclosed in Japanese Patent Application Kokai No. 53-93515 and Japanese Patent Publication No. 6-506891. These devices are advantageous in that a compact driving mechanism can be constructed.

Typical electric motors built into hubs are ordinarily installed so that the direction of the central axial line of the output shaft is perpendicular to the hub shaft of the bicycle. To ensure rotational balance of the system, the system is designed so that the center of gravity of the electric motor is located more or less on the axis of rotation of the motor. To accommodate the inertial moment of the wheel, it is also desirable to position of the center of gravity of the electric motor as close as possible to the center line of the hub shaft of the wheel. In most cases, however, the center of gravity of the electric motor is located in a position which is removed from the center line of the hub shaft. Finally, to accommodate the fluctuations in inertial moment that accompany rotational acceleration and deceleration of the motor output shaft, it is desirable to align the axial line of the motor output shaft and the axial line of the hub shaft so that the axial lines are coaxial. However, if the output shaft of the electric motor is installed coaxially with the hub shaft inside the hub (whose size is limited), there is often insufficient space inside the hub to accommodate a gear reduction mechanism for the motor. Thus, it is difficult to construct a motor-driven hub which accommodates rotational balance of the motor, the inertial moment of the wheel, and acceleration and deceleration of the motor all at the same time.

In bicycles with a chain transmission, the rear hub is usually equipped with a freewheel which is arranged so that a positive rotational force is transmitted to the driving wheel only when driving force is being applied to the pedals, and so that the positive rotational force of the driving wheel is not conversely transmitted back to the pedals. This is usually accomplished by a one-way clutch mechanism mounted in the freewheel. However, the front hub ordinarily is not equipped with such a free wheel mechanism. Thus, if an electric motor is built into the front hub so that the front wheel is motor-driven, then pedal driving is transmitted to the output shaft of the electric motor when the electric motor is not in operation, and operation of the pedals becomes difficult. However, since the hub has only a limited space, it is very difficult to install an electric motor, a one-way clutch mechanism and a speed reduction mechanism inside the hub.

SUMMARY OF THE INVENTION

The present invention is directed to a motor-driven bicycle hub wherein an electric motor, a one-way clutch mechanism and a speed reduction mechanism are mounted inside the hub to accommodate rotational balance of the motor, the inertial moment of the wheel, and fluctuations of the inertial moment caused be the acceleration and deceleration of the motor without creating excessive size and weight.

In one embodiment of the present invention, a motor-driven hub for a bicycle includes a hub shaft, a hub body rotatably mounted about the hub shaft, a drive member coaxially mounted with the hub shaft, a motor coupled to the drive member for rotating the drive member, and a one-way clutch disposed in a transmission path between the drive member and the hub body for transmitting rotation of the drive member to the hub body only in one direction. A gear reduction mechanism in the form of a planetary gear unit may be mounted in the transmission path between the drive member and the hub body so that the hub body rotates slower than the drive member. The motor may be mounted outside the hub or inside the hub. When mounted inside the hub, the motor may be mounted coaxially about the hub shaft so that the center of gravity of the motor lies within the hub along the axis of the hub.

DETAILED DESCRIPTION OF THE EMBODIMENTS

Figure 1:
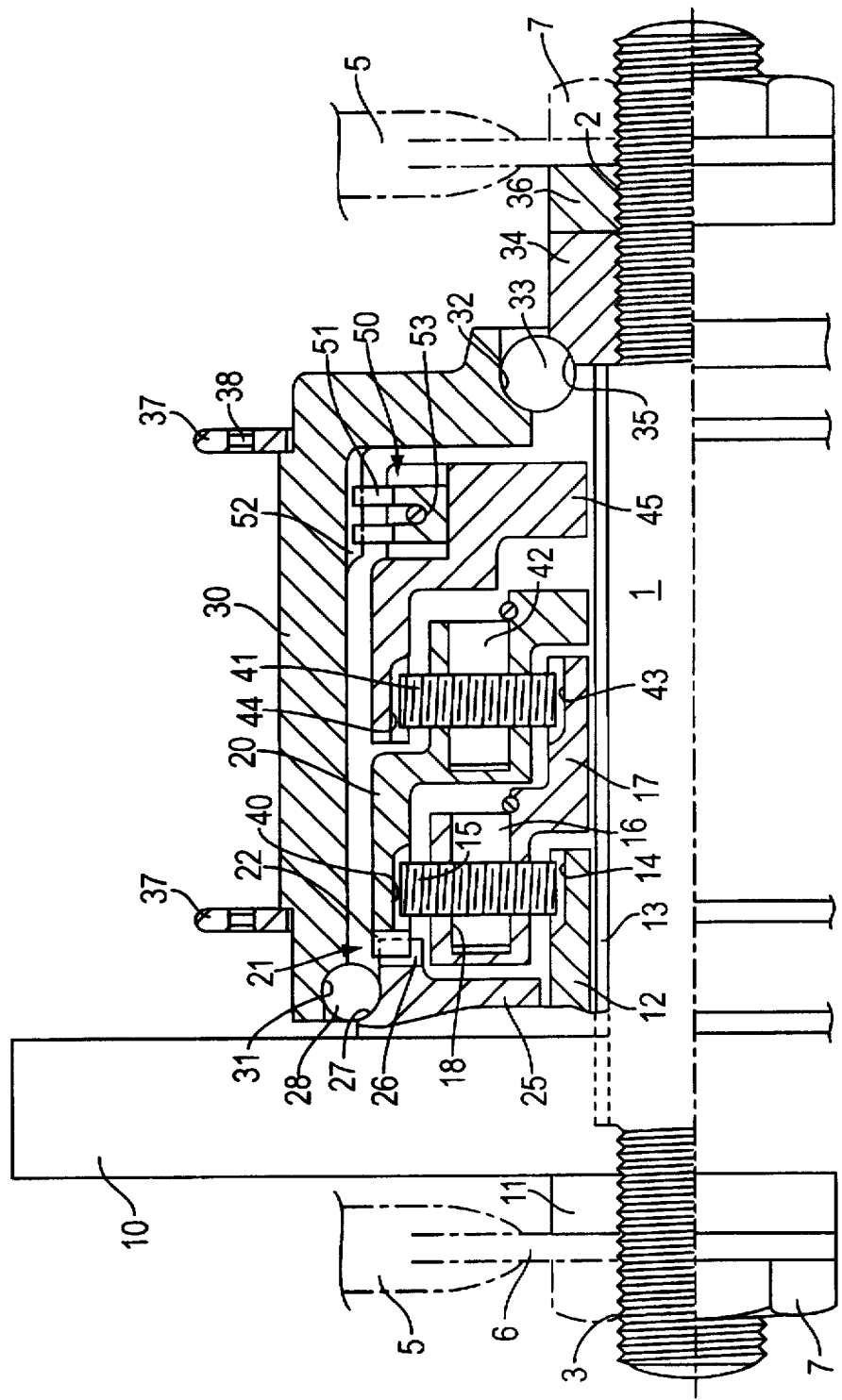
FIG. 1 is a cross sectional view of a particular embodiment of a motor-driven hub according to the present invention.

FIG. 1 is a cross sectional view of a particular embodiment of a motor driven hub according to the present invention. As shown in FIG. 1, the hub shaft 1 is a hollow or solid shaft which has male screws 2, 3 formed on both ends. Nuts 7 are screwed onto the male screws 2, 3, and the claws 6 of the front fork 5 are inserted and fastened to the hub shaft 1. An electric motor 10 is installed on one end of the hub shaft 1 by a nut 11. Electric motor 10 is driven by a DC power supply output from a battery (not shown in the figures). A central hole 13 is formed in the center of the motor output shaft 12, and the hub shaft 1 is inserted into the central hole 13. Thus, the central axial line of the motor output shaft 12 of the electric motor 10 coincides with the central axial line of the hub shaft 1.

A first pinion 14 is formed around the outer circumference of the tip end of the motor output shaft 12, and planetary gears 15 engage with the first pinion 14. Three of these planetary gears 15 are installed on a rotating arm 17 in positions located at equal angles around the circumference of the first pinion 14. Both ends of the shaft 16 of each planetary gear 15 are supported by bearing parts 18 so that shaft 16 is free to rotate on rotating arm 17. The rotating arm 17 has a substantially annular shape, and it is installed so that it can rotate about the hub shaft 1.

A first ring gear 20 is installed around the outside of the three planetary gears 15. A coupling 21 equipped with square teeth 22 is formed on one end surface of first ring gear 20, and these teeth 22 engage with square teeth 26 formed on a cone 25. Thus, the first ring gear 20 is fastened to the hub shaft 1 via the cone 25.

A rolling surface 27 is formed on the outer circumference of the cone 25, and steel balls 28 are installed so that balls 28 roll on rolling surface 27. The steel balls 28 also roll on a rolling surface 31 formed on one end of a cylindrically shaped hub body 30. A rolling surface 32 is formed on the other end of the hub body 30, and steel balls 33 roll on this rolling surface 32. At the same time, steel balls 33 also roll on a rolling surface 35 formed on a cone 34. The cone 34 is fastened to the hub shaft 1 by a lock nut 36. Thus, the steel balls 28, 33, cones 25, 34 and hub body 30 are supported so that the parts are free to rotate relative to each other. Two flanges 37 are formed parallel to each other as integral parts of the hub body 30, and the ends of spokes (not shown in the figures) are anchored in spoke holes 38 formed in these flanges 37.

The planetary gears 15 engage with first inner circumferential teeth 40 of an annular gear formed on the first ring gear 20. Three second pinions 41 are rotatably supported on the first ring gear 20 through shafts 42. The second pinions 41 engage with outer circumferential teeth formed on the rotating arm 17. At the same time, the second pinions 41 engage with inner circumferential teeth 44 formed on a second ring gear 45. Since the second pinions 41 do not revolve around the hub shaft 1, the second pinions 41 are rotationally driven by rotating arm 17 via the outer circumferential teeth 43, and the second ring gear 45 is rotationally driven by the rotation of the second pinions 41 via the inner circumferential teeth 44.

A one-way clutch 50 in the form of a well-known a ratchet/pawl mechanism is installed on the outer circumference of the second ring gear 45. The pawls 51 of the one-way clutch 50 engage with teeth 52 formed on the inner circumferential surface of the hub body 30. The pawls 51 are tightened down toward the center of the hub by a circular spring 53 so that the pawls 51 are biased in a direction which causes the pawls 51 to project outward and engage with the ratchet teeth 52. The pawls 51 and ratchet teeth 52 are structured so that rotation in one direction only is transmitted to the hub body 30. As a result, it is possible to transmit only the motive force of the electric motor 10 to the wheel. If a one-way clutch 50 is not provided, then the rotor of the electric motor 10 must also be driven by pedaling when the electric motor 10 is stopped, so that pedaling becomes difficult. One-way clutch 50 also makes it possible to bypass the inertial moment of the rotor.

It should be apparent from the above description that a planetary gear mechanism is constructed from the first pinion 14 of the output shaft 12 of the electric motor 10, the planetary gears 15, the rotating arm 17 and the inner circumferential teeth 40 of the fixed ring gear 20. This structure forms a differential gear mechanism which also functions as a first speed reduction mechanism for stepping down the rotation of the output shaft 12 of electric motor 10. The output member of this first speed reduction mechanism is rotating arm 17. The stepped-down output of the electric motor 10 thus drives the rotation of the second pinions 41 which, in turn, drive the rotation of second ring gear 45. Since the number of teeth of the second pinions 41 is smaller than the number of inner circumferential teeth 44, a further speed reduction is achieved. This second planetary gear mechanism does not form a differential gear mechanism, but it does form a second speed reduction mechanism. The stepped-down rotation thus obtained drives the hub body 30 via the one-way clutch 50.

As an example of the first embodiment, the number of teeth of the first pinion 14=22 teeth, the number of the inner circumferential teeth 40=80 teeth, the external diameter of the rotating arm 17=66 mm, the number of the outer circumferential teeth 43=22 teeth, the number of the inner circumferential teeth 44 of the second ring gear 45=80 teeth, the external diameter of the hub body 30=75 mm, the internal diameter of the hub body 30 =67 mm, the external diameter of the electric motor 10=120 mm, and the overall length of the hub=approximately 100 mm.

Figure 2:
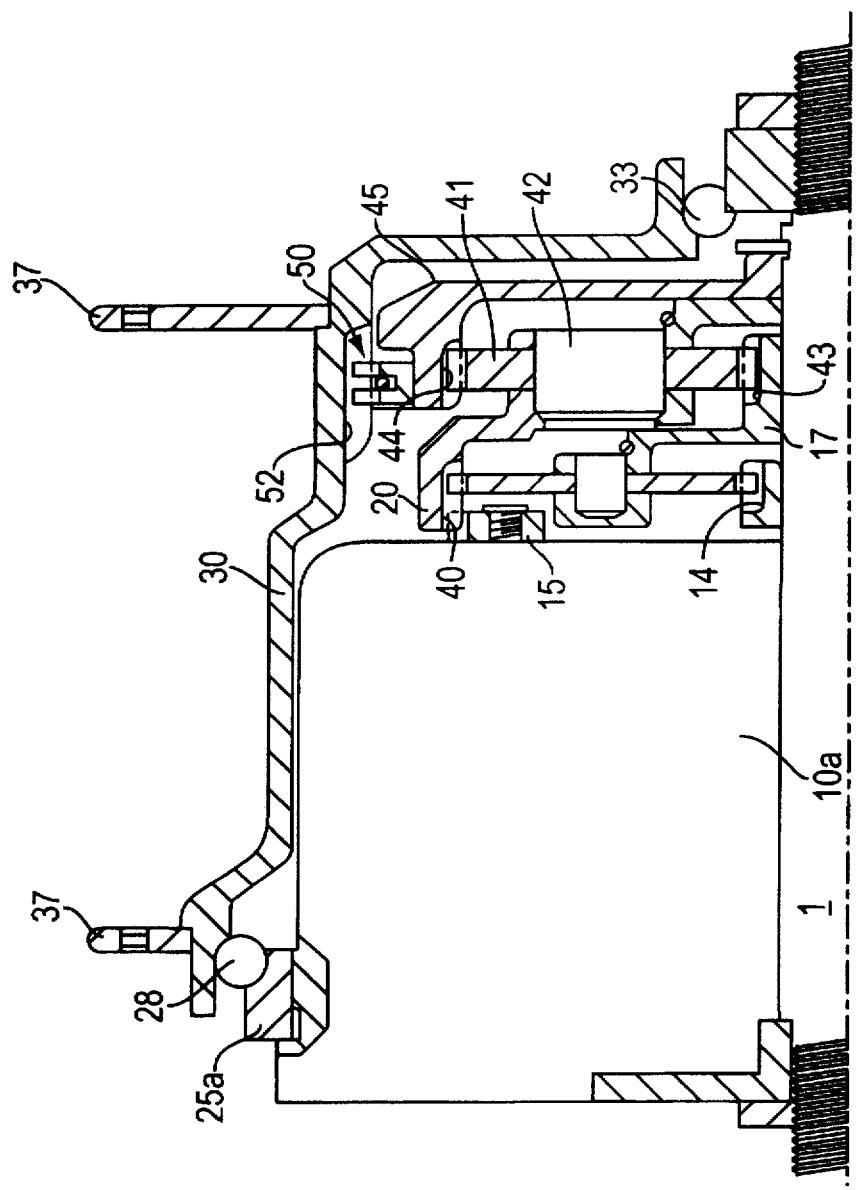
FIG. 2 is a cross sectional view of an alternative embodiment of a motor-driven hub according to the present invention.

FIG. 2 is a cross sectional view of an alternative embodiment of a motor driven hub according to the present invention. The speed reduction mechanism in this embodiment is basically the same as that in the embodiment shown in FIG. 1. However, in this embodiment the structure and installation position of the electric motor 10a and the numbers of teeth of the gears of the speed reduction mechanism are different. Only structures which differ from those in the first embodiment will be described below. Structures which are the same as in first embodiment will be labeled with the same symbols, and a description of these structures will be omitted.

As shown in FIG. 2, the electric motor 10a is built into the interior of the hub body 30 and is coaxially mounted about hub shaft 1. A cone 25a is fastened to the outer circumference of the casing of the electric motor 10a by a fastening means such as pressfitting, etc. Hub body 30 is rotatably supported on the casing of electric motor 10a by balls 28. The motive force transmission path and the speed reduction mechanism are the same as in the first embodiment.

As an example of the second embodiment, the number of teeth of the first pinion 14=22 teeth, the number of the first inner circumferential teeth 40=95 teeth, the number of the outer circumferential teeth 43=22 teeth, the number of the inner circumferential teeth 44 of the second ring gear 45=95 teeth, the external diameter of the hub body 30=105 mm, the internal diameter of the hub body 30=97 mm, and the overall length of the hub=approximately 100 mm.

Figure 3:
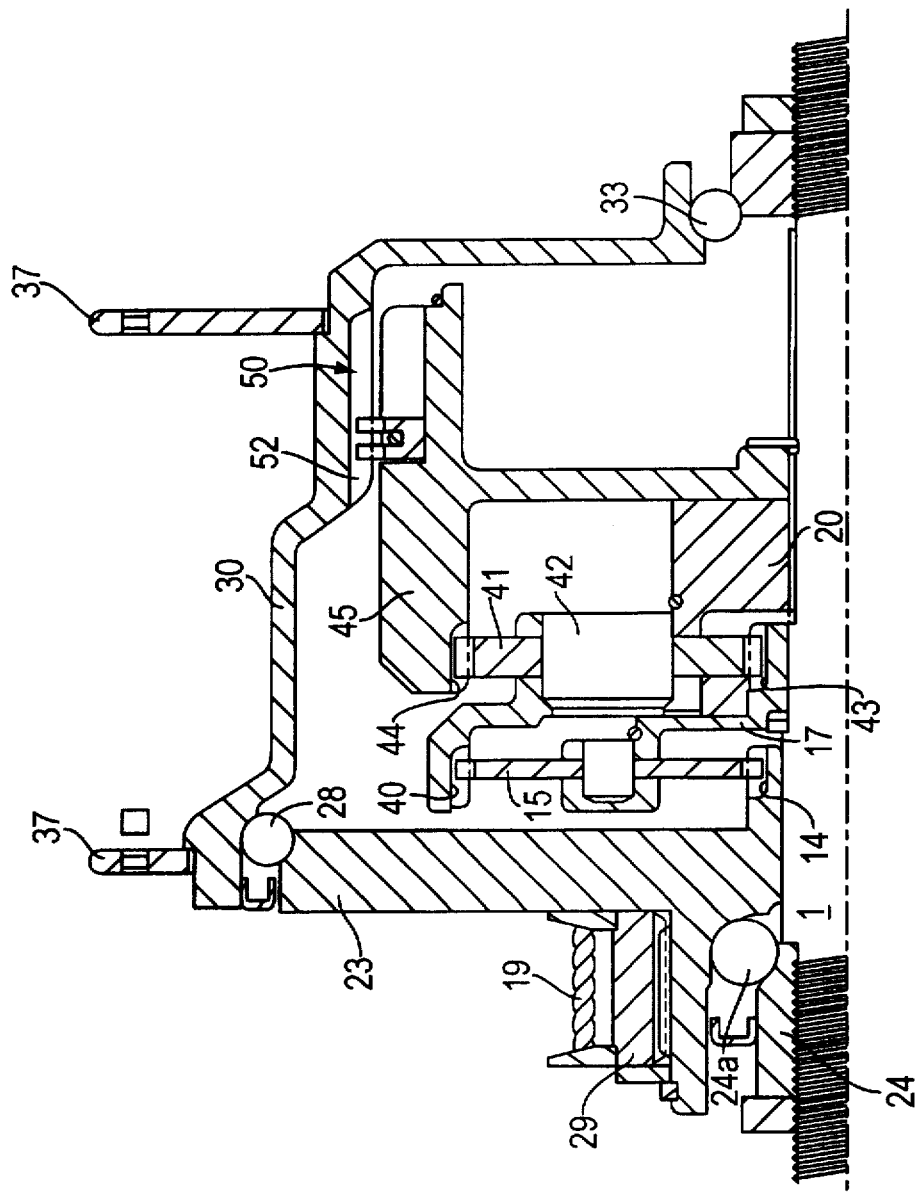
FIG. 3 is a cross sectional view of another alternative embodiment of a motor-driven hub according to the present invention.

FIG. 3 is a cross sectional view of another alternative embodiment of a motor driven hub according to the present invention. The speed reduction mechanism in this embodiment is basically the same as that in the first embodiment. However, the structure and installation position of the electric motor (not shown in the figures) and the number of teeth of the gears of the speed reduction mechanism are different. Only the structures which differ from those in the first embodiment will be described below. The structures which are the same as in the first embodiment will be labeled with the same symbols, and a description of these structures will be omitted.

In this embodiment, the electric motor (not shown in the figures) is fastened to the front fork 5 outside the hub body 30. The rotation from the output shaft of the electric motor drives a timing pulley 29 via a timing belt 19. The timing pulley 29 is spline-coupled to a driving disk 23 so that relative rotation of the timing pulley 29 and driving disk 23 is impossible. The first pinion 14 is formed as an integral part of the driving disk 23, and the first pinion 14 engages with planetary gears 15. The driving disk 23 is rotatably supported by steel balls 28 and steel balls 24a. The steel balls 24a are supported by a cone 24, and cone 24 is fastened to the hub shaft 1.

In the first embodiment, the first ring gear 20 was fastened in place by the engagement of teeth 22 formed on the first ring gear 20 and teeth 26 formed on cone 25. In this embodiment, splines are formed on the inner circumferential surface of first ring gear 20 and on the outer circumferential surface of the hub shaft 1, and these splines are engaged with each other. As a result, the first ring gear 20 and the hub shaft 1 are fastened to each other so that rotation of the first ring gear 20 relative to hub shaft 1 is prevented.

The third embodiment may have the same specifications (number of teeth on the gears, etc.) as the second embodiment.

Figure 4:
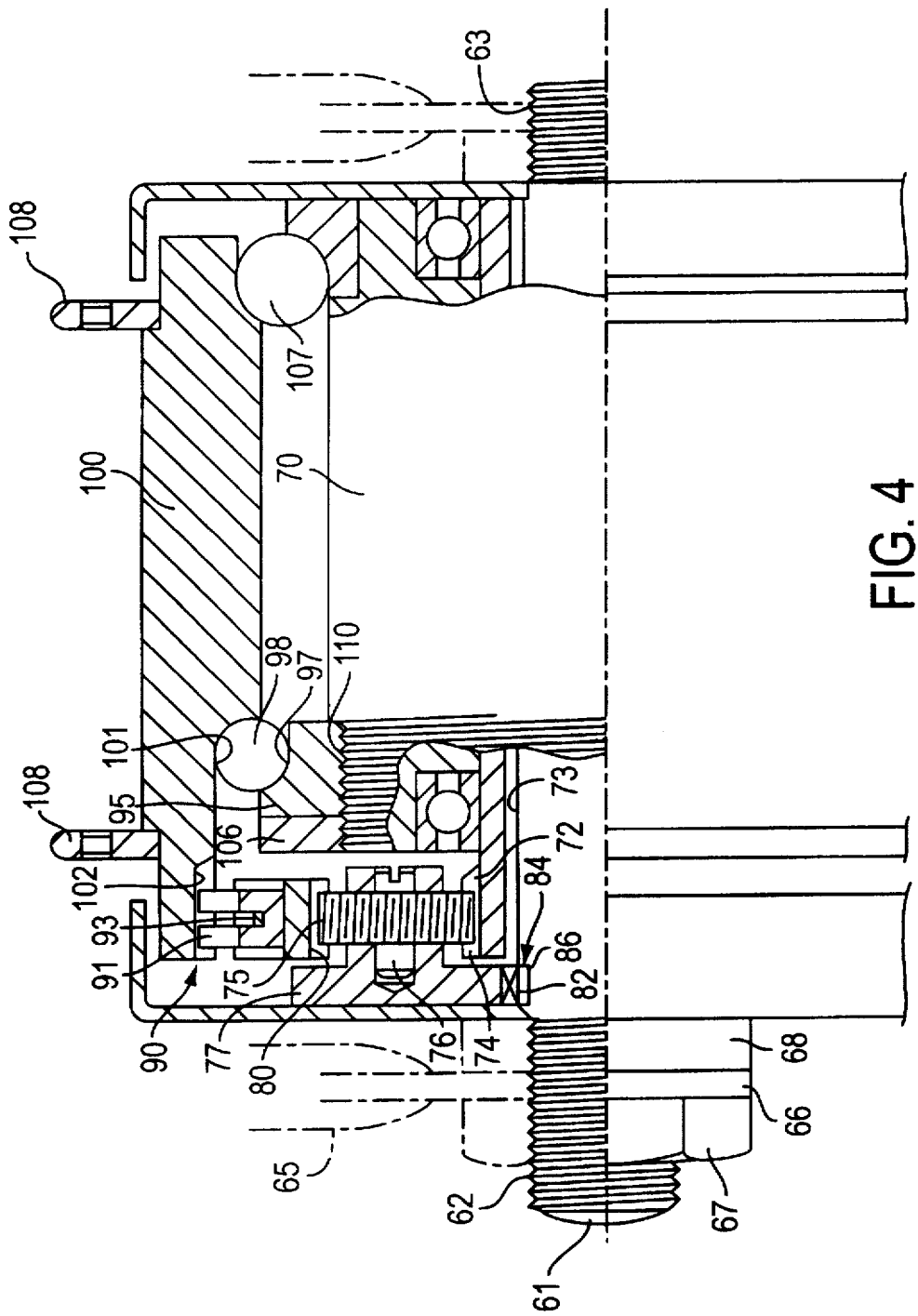
FIG. 4 is a cross sectional view of another alternative embodiment of a motor-driven hub according to the present invention.

FIG. 4 is a cross sectional view of another alternative embodiment of a motor driven hub according to the present invention. In this embodiment, hub shaft 61 is a hollow or solid shaft which has male screws 62, 63 formed on both ends. Nuts 67 are screwed onto the male screws 62, 63, and the claws 66 of the front fork 65 are inserted and fastened to the hub shaft 61. An electric motor 70 is installed around the circumference of the central portion of the hub shaft 61 so that the central axial line of the motor output shaft 72 of the electric motor 70 coincides with the central axial line of the hub shaft 61. More specifically, a central hole 73 is formed in the center of the motor output shaft 72, and the hub shaft 61 is inserted into the central hole 73. Electric motor 70 is driven by a DC power supply.

A pinion 74 is formed around the outer circumference of the tip end of the motor output shaft 72, and intermediate gears 75 engage with pinion 74. Three or four intermediate gears 75 are installed in positions located at equal angles around the circumference of the pinion 74. Both ends of the shaft 76 of each intermediate gear 75 are rotatably supported on a fixed arm 77, and the fixed arm 77 is fastened to the hub shaft 61 by a nut 68. Fixed arm 77 has an annular shape, and square teeth 82 are formed on the inner circumferential surface of fixed arm 77. The teeth 82 engage with square teeth 86 formed on the hub shaft 61 so that fixed shaft 77 is nonrotatably fastened to the hub shaft 61.

An annular ring gear 80 is installed around the outside of the three intermediate gears 75, and a one-way clutch 90 is installed around the outer circumference of the first ring gear 80. The pawls 91 of the one-way clutch 90 are biased by a circular spring 53 so that pawls 51 project outward and engage with the teeth 102 formed on the inner circumferential surface of the hub body 100. As with the previous embodiments, rotation of ring gear 80 in one direction only is transmitted to the hub body 100.

A screw 110 is formed around the outer circumference of the electric motor 70. A cone 95 which has a rolling surface 97 formed on its outer circumference is screwed onto the screw 110, and steel balls 98 are installed so that balls 98 roll on the rolling surface 97. The steel balls 98 also roll on a rolling surface 101 formed on the inner circumferential surface of the cylindrical hub body 100. The cone 95 is fastened to the case of the electric motor 100 by a lock nut 106. Similarly, the other end of the hub body 100 is rotatably supported by steel balls 107 on the electric motor 70. Two flanges 108 are formed parallel to each other as integral parts of the hub body 100, and the ends of spokes (not shown in the figures) are anchored in spoke holes formed in flanges 108.

It should be apparent from the above description that the pinion 74 of the output shaft 72 of the electric motor 70, the intermediate gears 75 and ring gear 80 form a speed reduction mechanism. In other words, the rotation of the pinion 74, which is the output rotation of the electric motor 70, is stepped down and transmitted to ring gear 80, and this rotation further drives the rotation of the hub body 100 via the one-way clutch 90.

While the above is a description of various embodiments of the present invention, further modifications may be employed without departing from the spirit and scope of the present invention. For example, in the embodiments described above, an electric motor was built into the front hub. However, it would also be possible to build an electric motor into the rear hub. Thus, the scope of the invention should not be limited by the specific structures disclosed. Instead, the true scope of the invention should be determined by the following claims. Of course, although labeling symbols are used in the claims in order to facilitate reference to the figures, the present invention is not intended to be limited to the constructions in the appended figures by such labeling.

What is claimed is:

1. A driving apparatus for a bicycle comprising:

a hub shaft (1,61);

a hub body (30,100) rotatably mounted about the hub shaft (1,61);

a drive member (12,23,72) mounted coaxially with the hub shaft (1,61) for coupling to a motor (10,10a,70);

a one-way clutch (50,90) disposed in a transmission path between the drive member (12,23,72) and the hub body (30,100) for transmitting rotation of the drive member (12,23,72) to the hub body (30,100) only in one direction;

speed reduction means (14,15,17,20,41,45,74,75,77,80) disposed in the transmission path between the drive member (12,23,72) and the hub body (30,100) for stepping down rotation of the drive member (12,23,72) to the hub body (30,100) so that the hub body (30,100) rotates slower than the drive member (12,23,72);

wherein the speed reduction means (14,15,17,20,41,45) comprises:

a first pinion (14) disposed on the drive member (12,23) for rotation therewith;

a rotating arm (17) rotatably mounted about the hub shaft (1), the rotating arm (17) including a plurality of rotating arm teeth (43) disposed along a circumference thereof;

a plurality of planet gears (15) rotatable mounted to the rotating arm (17) and meshing with the first pinion (14) for rotating in response to rotation of the first pinion (14);

a first ring gear (20) fixed to the hub shaft (1) and meshing with the plurality of planet gears (15);

a second pinion (41) rotatable mounted to the first ring gear (20) and meshing with the plurality of rotating arm teeth (43) for rotating in response to rotation of the rotating arm teeth (43); and a second ring gear (45) rotatable mounted about the hub shaft (1) and meshing with the second pinion (41) for rotating in response to rotation of the second pinion (41).

2. The apparatus according to claim 1 wherein the one-way clutch (50) is disposed between the second ring gear (45) and the hub body (30).

3. The apparatus according to claim 2 wherein the one-way clutch (50) comprises:

a plurality of pawls (51) mounted to the second ring gear (45);

a plurality of ratchet teeth (52) disposed on the hub body (30); and a spring (53) for biasing the plurality of pawls (51) against the plurality of ratchet teeth (52).

4. A driving apparatus for a bicycle comprising:

a hub shaft (1,61);

a hub body (30,100) rotatably mounted about the hub shaft (1,61);

a drive member (12,23,72) mounted coaxially with the hub shaft (1,61) for coupling to a motor (10,10a,70);

a one-way clutch (50,90) disposed in a transmission path between the drive member (12,23,72) and the hub body (30,100) for transmitting rotation of the drive member (12,23,72) to the hub body (30,100) only in one direction;

a first speed reduction means (14,15,17) disposed in the transmission path between the drive member (12,23) and the hub body (30) for stepping down rotation of the drive member (12,23) to an intermediate member (17) by a first amount;

a second speed reduction means (20,41,45) coupled to the intermediate member (17) and disposed in the transmission path between the first speed reduction means (14,15,17) and the hub body (30) for stepping down rotation of the intermediate member (17) to the hub body (30) by a second amount; and wherein the hub body (30) rotates slower than the drive member (12,23).

5. The apparatus according to claim 1 wherein the drive member (12) comprises an annular shaft mounted coaxially on the hub shaft (1) for rotation about the hub shaft (1).

6. A driving apparatus for a bicycle comprising:

a hub shaft (1,61);

a hub body (30,100) rotatably mounted about the hub shaft (1,61);

a drive member (12,23,72) mounted coaxially with the hub shaft (1,61);

a motor (10,10a,70) coupled to the drive member (12,23, 72) for rotating the drive member (12,23,72);

a one-way clutch (50,90) disposed in a transmission path between the drive member (12,23,72) and the hub body (30,100) for transmitting rotation of the drive member (12,23,72) to the hub body (30,100) only in one direction;

speed reduction means (14,15,17,20,41,45,74,75,77,80) disposed in the transmission path between the drive member (12,23,72) and the hub body (30,100) for stepping down rotation of the drive member (12,23,72) to the hub body (30,100) so that the hub body (30,100) rotates slower than the drive member (12,23,72);

wherein the speed reduction means (14,15,17,20,41,45) comprises:

a first pinion (14) disposed on the drive member (12,23) for rotation therewith;

a rotating arm (17) rotatably mounted about the hub shaft (1), the rotating arm (17) including a plurality of rotating arm teeth (43) disposed along a circumference thereof;

a plurality of planet gears (15) rotatably mounted to the rotating arm (17) and meshing with the first pinion (14) for rotating in response to rotation of the first pinion (14);

a first ring gear (20) fixed to the hub shaft (1) and meshing with the plurality of planet gears (15);

a second pinion (41) rotatably mounted to the first ring gear (20) and meshing with the plurality of rotating arm teeth (43) for rotating in response to rotation of the rotating arm teeth (43); and a second ring gear (45) rotatably mounted about the hub shaft (1) and meshing with the second pinion (41) for rotating in response to rotation of the second pinion (41).

7. The apparatus according to claim 6 wherein the one-way clutch (50) is disposed between the second ring gear (45) and the hub body (30).

8. The apparatus according to claim 7 wherein the one-way clutch (50) comprises:

a plurality of pawls (51) mounted to the second ring gear (45);

a plurality of ratchet teeth (52) disposed on the hub body (30); and a spring (53) for biasing the plurality of pawls (51) against the plurality of ratchet teeth (52).

9. A driving apparatus for a bicycle comprising:

a hub shaft (1,61);

a hub body (30,100) rotatably mounted about the hub shaft (1,61);

a drive member (12,23,72) mounted coaxially with the hub shaft (1,61);

a motor (10,10a,70) coupled to the drive member (12,23, 72) for rotating the drive member (12,23,72);

a one-way clutch (50,90) disposed in a transmission path between the drive member (12,23,72) and the hub body (30,100) for transmitting rotation of the drive member (12,23,72) to the hub body (30,100) only in one direction;

a first speed reduction means (14,15,17) disposed in the transmission path between the drive member (12,23) and the hub body (30) for stepping down rotation of the drive member (12,23) to an intermediate member (17) by a first amount;

a second speed reduction means (20,41,45) coupled to the intermediate member (17) and disposed in the transmission path between the first speed reduction means (14,15,17) and the hub body (30) for stepping down rotation of the intermediate member (17) to the hub body (30) by a second amount; and wherein the hub body (30) rotates slower than the drive member (12,23).

10. The apparatus according to claim 6 wherein the drive member (12) comprises an annular shaft mounted coaxially on the hub shaft (1) for rotation about the hub shaft (1).

11. The apparatus according to claim 6 wherein the motor (10) is mounted outside the hub body (30).

12. The apparatus according to claim 6 wherein the motor (10a,70) is mounted inside the hub body (30,100).

13. The apparatus according to claim 6 wherein the motor (10a,70) is fastened to the hub shaft (1,61).

14. The apparatus according to claim 13 wherein the motor (10a,70) is coaxially mounted about the hub shaft (61).

* * * * *